No. 742,429.

Patented October 27, 1903.

UNITED STATES PATENT OFFICE.

CARL HERMANN VON HOESSLE, OF RADEBEUL, NEAR DRESDEN, GERMANY, ASSIGNOR TO CHEMISCHE FABRIK VON HEYDEN ACTIENGESELLSCHAFT, OF RADEBEUL, NEAR DRESDEN, GERMANY.

SOLUBLE MERCUROUS IODIDE.

SPECIFICATION forming part of Letters Patent No. 742,429, dated October 27, 1903.

Application filed June 9, 1903. Serial No. 160,743. (Specimens.)

*To all whom it may concern:*

Be it known that I, CARL HERMANN VON HOESSLE, a subject of the King of Saxony, and a resident of Radebeul, near Dresden, in the Kingdom of Saxony, in the German Empire, have invented a new and useful Mercurous Iodide Soluble in Water, of which the following is a specification.

My invention consists in a new salt of mercury soluble in water, which may be used in medicine in all cases in which preparations of mercury and iodin are used. In the manufacture of this salt I can proceed as follows: Five parts of albumose or peptone or albumen, dissolved in one hundred and fifty parts of water, are mixed with two parts of iodide of potassium (KI) dissolved in one hundred and fifty parts of water. To this solution a solution of three parts of mercurous nitrate in one hundred parts of water is added while stirring. If any precipitate is formed, this is dissolved by a careful addition of alkali. The resulting solution of colloidal mercurous iodide is dialyzed and evaporated at a low temperature in order to obtain dry mercurous iodide. The latter may also be precipitated from the solution by means of alcohol or by the addition of acid. In the latter case the washed precipitate of colloidal mercurous iodide is dissolved again in water by neutralizing with the hydroxids or carbonates of potassium and sodium, evaporated at low temperature, and then pulverized. In this manner the colloidal mercurous iodide is obtained as an orange powder of neutral reaction, soluble in water, insoluble in alcohol and ether. This method or process of manufacture may be varied by the use of other proportions, by the employment of other iodides of alkali or earth-alkali metals, and by the use of other substances of the albumen group or other splitting off-products and derivates of the albumins.

What I claim as my invention is—

The product herein described, colloidal mercurous iodide, being an orange-colored powder of neutral reaction, soluble in water, insoluble in alcohol and ether.

In witness whereof I have hereunto set my hand in presence of two witnesses.

CARL HERMANN VON HOESSLE.

Witnesses:
 GEORG RICHTER,
 GEORG HEUSSINGER.